(12) United States Patent
Kinoshita

(10) Patent No.: US 10,844,958 B2
(45) Date of Patent: Nov. 24, 2020

(54) GASKET AND MANUFACTURING METHOD THEREOF

(71) Applicant: Ishikawa Gasket Co., Ltd., Tokyo (JP)

(72) Inventor: Yuichi Kinoshita, Utsunomiya (JP)

(73) Assignee: ISHIKAWA GASKET CO., LTD., Tokyo (JP)

( * ) Notice: Subject to any disclaimer, the term of this patent is extended or adjusted under 35 U.S.C. 154(b) by 162 days.

(21) Appl. No.: 15/955,854

(22) Filed: Apr. 18, 2018

(65) Prior Publication Data

US 2018/0306323 A1 Oct. 25, 2018

(30) Foreign Application Priority Data

Apr. 19, 2017 (JP) .................................. 2017-082493

(51) Int. Cl.
    *F16J 15/08* (2006.01)
(52) U.S. Cl.
    CPC ....... *F16J 15/0818* (2013.01); *F16J 15/0806* (2013.01); *F16J 15/0812* (2013.01)
(58) Field of Classification Search
    CPC .... F16J 15/0812; F16J 15/0806; F16J 15/121; F16J 15/30
    See application file for complete search history.

(56) References Cited

U.S. PATENT DOCUMENTS

| | | | | |
|---|---|---|---|---|
| 2,119,158 A | * | 5/1938 | Frey ..................... | F16J 15/0812 277/592 |
| 2,197,916 A | * | 4/1940 | Balfe ................... | F16J 15/0812 428/608 |
| 2,275,085 A | * | 3/1942 | Michel ................. | F16J 15/0812 428/591 |
| 3,737,169 A | * | 6/1973 | Glynn .................... | F16J 15/123 277/596 |
| 3,814,142 A | * | 6/1974 | Barnett .................. | D03D 25/00 139/420 C |
| 4,828,932 A | * | 5/1989 | Morimoto ................ | E04C 2/08 181/292 |
| 5,297,806 A | * | 3/1994 | Kestly .................... | F16J 15/122 277/592 |
| 6,699,540 B1 | * | 3/2004 | Tsukamoto ............. | B21F 43/00 245/1 |

(Continued)

FOREIGN PATENT DOCUMENTS

| | | | | | |
|---|---|---|---|---|---|
| JP | 07217745 A | * | 8/1995 | ............... | D04C 1/02 |
| JP | 2001032936 A | * | 2/2001 | ............. | C22C 37/08 |
| JP | 2015132378 A | * | 7/2015 | | |

*Primary Examiner* — Eugene G Byrd
(74) *Attorney, Agent, or Firm* — Manabu Kanesaka

(57) ABSTRACT

An object of the present invention is to provide a gasket capable of improving cooling efficiency with a simpler configuration while keeping performance of the gasket and a manufacturing method thereof. A gasket includes a first annular portion which is formed by a metal wire woven fabric obtained by weaving a first metal wire and includes a seal target hole and a main body portion which is in contact with an outer peripheral edge of the first annular portion, in which the first metal wire forming the first annular portion and the first metal wire forming the main body portion are entangled with each other and a second metal wire is woven together with the first metal wire forming the first annular portion to form the first annular portion as a high thermal conduction region.

6 Claims, 4 Drawing Sheets

(56) References Cited

U.S. PATENT DOCUMENTS

| | | | |
|---|---|---|---|
| 9,751,244 B2* | 9/2017 | Dry | B64D 37/32 |
| 2012/0328419 A1* | 12/2012 | Riggi, Jr. | B23K 15/006 |
| | | | 415/174.2 |
| 2014/0217683 A1* | 8/2014 | Martinetto | F16J 15/121 |
| | | | 277/654 |
| 2016/0017999 A1* | 1/2016 | Boyd | B29C 39/42 |
| | | | 277/651 |
| 2016/0369436 A1* | 12/2016 | Stewart | D04B 1/225 |
| 2017/0037970 A1* | 2/2017 | Schollhammer | F16J 15/064 |
| 2017/0051831 A1* | 2/2017 | Haley | F16J 15/028 |
| 2018/0306323 A1* | 10/2018 | Kinoshita | F16J 15/0818 |

* cited by examiner $\rho 1 > \rho 2 > \rho 3$

GASKET AND MANUFACTURING METHOD THEREOF

RELATED APPLICATIONS

The present application claims priority from Japanese Application No. 2017-082493, filed Apr. 19, 2017, the disclosure of which is hereby incorporated by reference herein in its entirety.

BACKGROUND OF THE INVENTION

Technical Field

The present invention relates to a gasket and a gasket manufacturing method, and more particularly, to a gasket having improved cooling efficiency and a manufacturing method thereof.

Related Art of the Invention

As a gasket which is sandwiched between a cylinder head and a cylinder block, a gasket in which a metal plate surrounding a combustion chamber hole is formed of a high thermal conduction metal has been used (for example, see JP 2014-111948A). In such a gasket, heat can be satisfactorily dissipated by the excellent thermal conductivity of the metal plate surrounding the combustion chamber hole.

SUMMARY OF THE INVENTION

Incidentally, a gasket which is formed of a material having a high thermal conductivity such as copper, copper alloy, and graphite is known in addition to the gasket disclosed in JP 2014-111948 A. The gasket which is formed of a material having a high thermal conductivity is excellent in cooling efficiency compared to a gasket formed of stainless steel, but has various problems in which a sealing property is poor, a manufacturing cost is high, and maintenance is essentially required.

Here, the gasket disclosed in JP 2014-111948 A has attempted to solve the above-described problems by using both of a gasket substrate formed of stainless steel and a metal plate having a high thermal conductivity and surrounding a combustion chamber hole. However, since there is a need to combine a plurality of members, another problem arises wherein the number of components increases or the manufacturing process becomes complicated. Further, since it is difficult to apply the same structure to a small hole such as a water hole or oil hole having a small opening diameter compared to the combustion chamber hole, there is a problem that only the cooling efficiency of a specific position can be improved.

The present invention has been made in view of the above-described problems and an object of the present invention is to provide a gasket capable of improving cooling efficiency with a simpler configuration while keeping performance of a gasket and a gasket manufacturing method.

A gasket of the present invention to solve the problem is formed by a metal wire woven fabric, the gasket including: an annular portion which includes at least one through-hole; and a main body portion which is in contact with an outer peripheral edge of the annular portion, wherein first metal wires of the metal wire woven fabric forming the annular portion and the metal wire woven fabric forming the main body portion are entangled with each other so that the annular portion and the main body portion are joined to each other, a thermal conduction region is formed in at least a partial region of the gasket in the top view, and a second metal wire having thermal conductivity higher than that of the first metal wire is woven to the thermal conduction region together with the first metal wire.

A gasket manufacturing method of the present invention to solve the problem comprises weaving a cylindrical metal wire woven fabric and another cylindrical metal wire woven fabric; forming a high thermal conduction region by weaving a second metal wire having thermal conductivity higher than that of a first metal wire in at least a partial region of the cylindrical metal wire woven fabric and the other cylindrical metal wire woven fabric, together with the first metal wire forming the partial region, at the time of weaving the cylindrical metal wire woven fabric and the other cylindrical metal wire woven fabric; crushing the cylindrical metal wire woven fabric in a cylindrical axis direction to form an annular portion and crushing the other cylindrical metal wire woven fabric in a radial direction to form a main body portion; forming an arrangement hole at a predetermined position of the obtained main body portion and arranging the annular portion at the arrangement hole; and crushing the main body portion and the annular portion to be integrated with each other.

According to the present invention, the annular portion and the main body portion are formed by the metal wire woven fabric and the high thermal conduction region is formed by entangling the first metal wires to be joined together and weaving the second metal wires each having higher thermal conductivity than the first metal wires. Therefore, since the compressive stress generated by the metal wire woven fabric is used for the gasket, it is possible to improve cooling efficiency of a target portion by the high thermal conduction region while keeping the sealing performance. Since the high thermal conduction region can be formed only by weaving the second metal wires together with the first metal wires, it is advantageous to decrease the number of components or simplify the manufacturing process and to form the high thermal conduction region at an arbitrary position.

In this way, according to the present invention, it is possible to improve cooling efficiency with a simpler configuration while keeping performance of a gasket compared to a conventional gasket using a metal plate having high thermal conductivity.

BRIEF DESCRIPTION OF DRAWINGS

FIGS. 2A to 2C illustrate a part of a gasket manufacturing method of FIG. 1, wherein FIGS. 2A to 2C are diagrams illustrating metal wire woven fabrics forming a first annular portion, a second annular portion, and a main body portion, respectively;

FIGS. 3A and 3B illustrate apart of the gasket manufacturing method of FIG. 1, wherein FIG. 3A is a perspective view illustrating the main body portion and FIG. 3B is a perspective view illustrating a state where the first annular portion and the second annular portion are arranged in the main body portion.

DETAILED DESCRIPTION OF THE INVENTION

Figure 1:
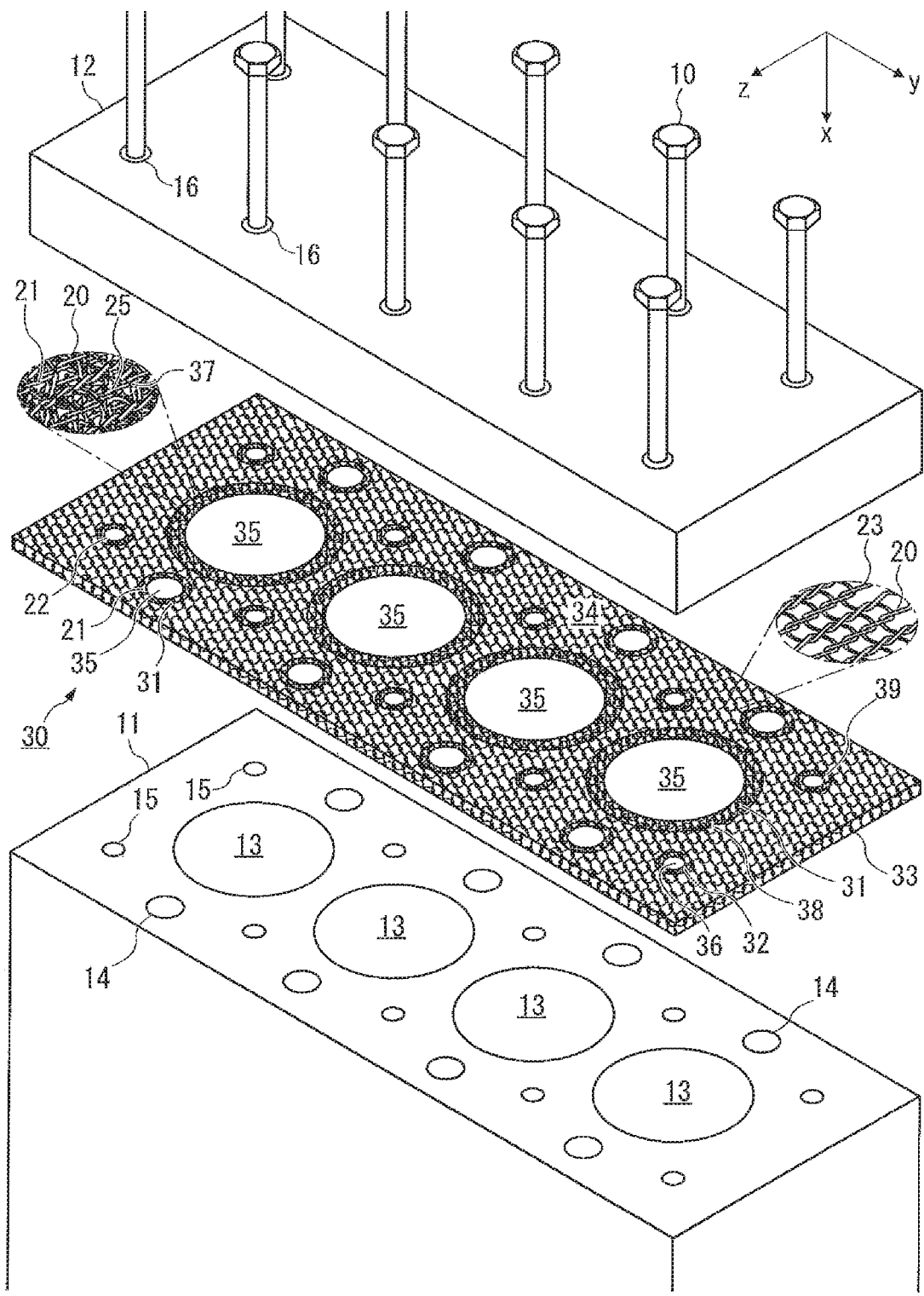
FIG. 1 is a perspective view illustrating a first embodiment of a gasket of the present invention.

Hereinafter, embodiments of the present invention will be described with reference to the drawings. In the drawings, x indicates a thickness direction and y and z indicate directions which are orthogonal to the x direction and are orthogonal to each other. Additionally, in FIGS. 1 to 4, dimensions are changed so that the configuration is easily understood and dimensions are not necessarily to scale with those of actually manufactured products.

As illustrated in FIG. 1, a gasket 30 of a first embodiment is a cylinder head gasket which is sandwiched between a cylinder block 11 and a cylinder head 12 and is fastened by bolts 10.

The cylinder block 11 is provided with four cylinder bores 13 which correspond to seal target holes and a water/oil holes 14 which are water holes for a water jacket formed on the outer periphery of the cylinder bore 13 or oil holes for a lubricating oil. Pistons (not illustrated) are assembled inside the cylinder bores 13 so as to be movable in the vertical direction. In the cylinder block 11, four bolt holes 15 are formed for one cylinder bore 13 at the outer periphery of the cylinder bore 13.

An injector or intake/exhaust valve (not illustrated) is assembled to the cylinder head 12 and a bolt holes 16 corresponding to the bolt holes 15 of the cylinder block 11 are penetrated therethrough.

The gasket 30 is formed by metal wire woven fabrics 21 to 23 obtained by weaving a first metal wire 20 and includes a first annular portion 31 which is formed by the metal wire woven fabric 21, a second annular portion 32 which is formed by the metal wire woven fabric 22, and a main body portion 33 which is formed by the metal wire woven fabric 23. The gasket 30 includes a plate surface 34 in which the first metal wires 20 of the metal wire woven fabrics 21 to 23 forming the first annular portion 31, the second annular portion 32, and the main body portion 33 are entangled with one another to be joined together and which is formed at both ends in the x direction to extend in the plane yz and has a single plate shape wherein a plate thickness D1 in the x direction is 0.4 mm to 2.0 mm.

The first metal wire 20 is a thin metal thread having a diameter of 0.1 mm to 0.3 mm and stainless steel wire formed of SUS301, SUS304, SUS304L, or the like is exemplified. The first metal wire 20 of the embodiment is formed of the same metal to have the same diameter.

The metal wire woven fabrics 21 to 23 are formed by weaving the first metal wires 20 so that stitches (loops) 24 are continuously tied together. Specifically, the metal wire woven fabrics 21 to 23 are woven with weft weaving (flat weaving, rubber weaving, and pearl weaving) in which the stitches 24 are drawn out in a direction orthogonal to the extension direction of the woven first metal wire 20. The weaving method is not limited as long as the metal wire woven fabrics 21 to 23 are formed by weaving the first metal wires 20 and warp weaving (tricot weaving) may be used.

The first annular portion 31 includes a seal target hole 35 which is formed to penetrate in the x direction and is an annular member when viewed from above in the x direction. The second annular portion 32 includes a fastening tool insertion hole 36 which is formed to penetrate in the x direction and is an annular member when viewed above in the x direction.

The seal target holes 35 are through-holes corresponding to the cylinder bores 13 and the water/oil holes 14 of the cylinder block 11. The fastening tool insertion holes 36 are arranged around the seal target holes 35 and are through-holes through which bolts 10 are inserted. In addition, the first annular portions 31 are formed in various shapes to correspond to the cylinder bores 13 and the water/oil holes 14 of the cylinder block 11 and the shape is not limited to the annular shape in the top view.

When the gasket 30 is viewed above, a thermal conduction region is formed in at least a part of the entire region including the first annular portion 31, the second annular portion 32, and the main body portion 33. In the embodiment, the thermal conduction region is the first annular portion 31, has an annular shape in the top view, and surrounds the cylinder bore 13 or the water/oil hole 14.

In the first annular portion 31, the second metal wire 25 is woven to the metal wire woven fabric 21 together with the first metal wire 20. The second metal wire 25 is a thin thread having thermal conductivity higher than that of the first metal wire 20 and having a diameter of 0.1 mm to 0.3 mm. For example, when the first metal wire 20 is formed of stainless steel, the second metal wire 25 is preferably steel or a copper alloy for spring such as brass, phosphor bronze, nickel silver, and beryllium copper alloy.

The first annular portion 31 can have a filler 37. In the metal wire woven fabric 21 forming the first annular portion 31, a gap between the stitches 24 is sealed by the filler 37. As the filler 37, carbon is exemplified. Additionally, in the drawings, the filler 37 is depicted by dots, but in fact, the stitch 24 is sealed by the filler 37. A state in which the stitch 24 is blocked indicates a state in which a fluid does not pass through the stitch 24 and the first annular portion 31 is formed such that a fluid passing through the seal target hole 35 does not leak to the outside of the first annular portion 31 in the circumferential direction.

The main body portion 33 is adjacent to the outer peripheral edge of the first annular portion 31, is adjacent to the outer peripheral edge of the second annular portion 32, is formed to enclose the first annular portion 31 and the second annular portion 32, and is formed such that the outer peripheral shape is the same as the outer peripheral shape of the cylinder block 11 or the cylinder head 12. The main body portion 33 includes twelve first arrangement holes 38 and ten second arrangement holes 39.

The first arrangement hole 38 is formed in the vicinity of the center portion and the outer periphery of the main body portion 33, and the first annular portion 31 is arranged to be in contact with the inner peripheral edge thereof. The second arrangement holes 39 are formed around the first arrangement hole 38, and the second annular portion 32 is arranged to be adjacent to the inner peripheral edge thereof.

As illustrated in FIGS. 2A to 3B, in a manufacturing method of the gasket 30, the first annular portion 31 is formed by the cylindrical metal wire woven fabric 21 obtained by weaving the first metal wire 20 and the second metal wire 25 having high thermal conductivity. Further, the second annular portion 32 is formed by the cylindrical metal wire woven fabric 22 obtained by weaving the first metal wire 20. Further, the main body portion 33 is formed by another cylindrical metal wire woven fabric 23 obtained by weaving the first metal wire 20 and these members are compressed into a plate shape.

Figure 2A:
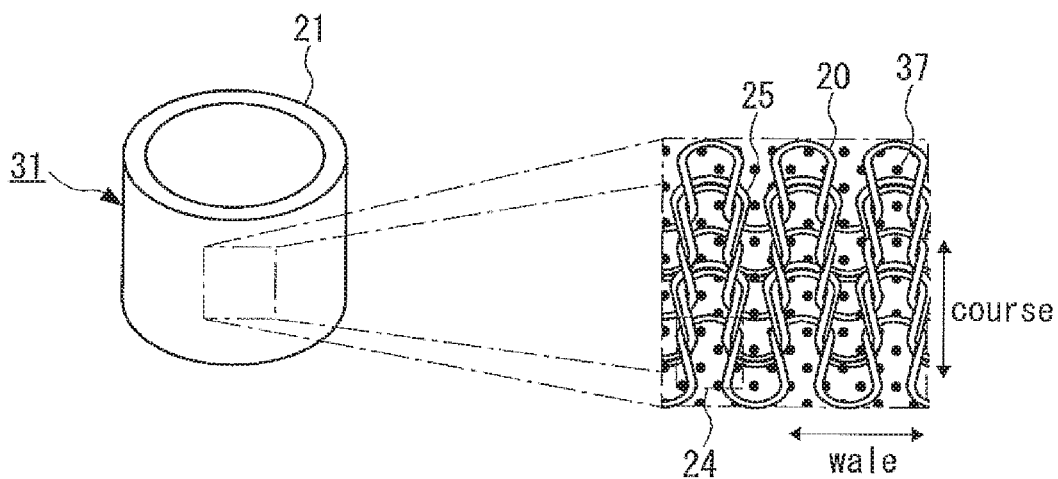
Figure 2B:
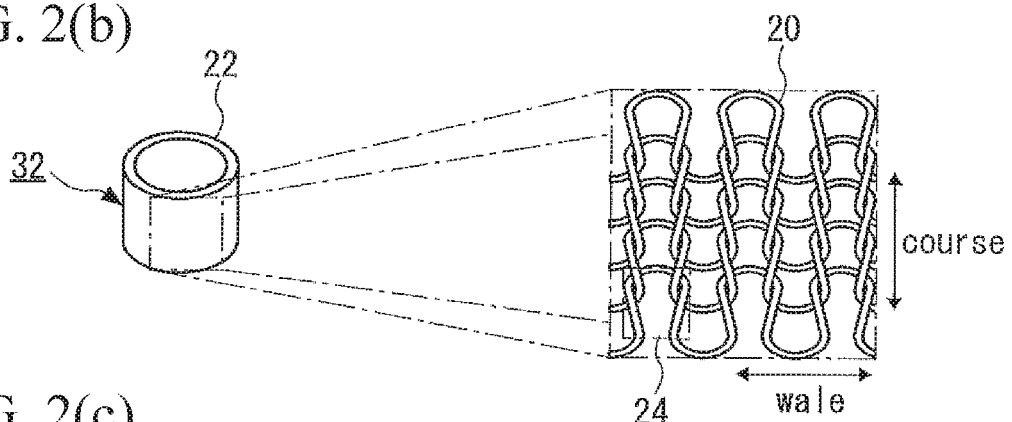
Figure 2C:
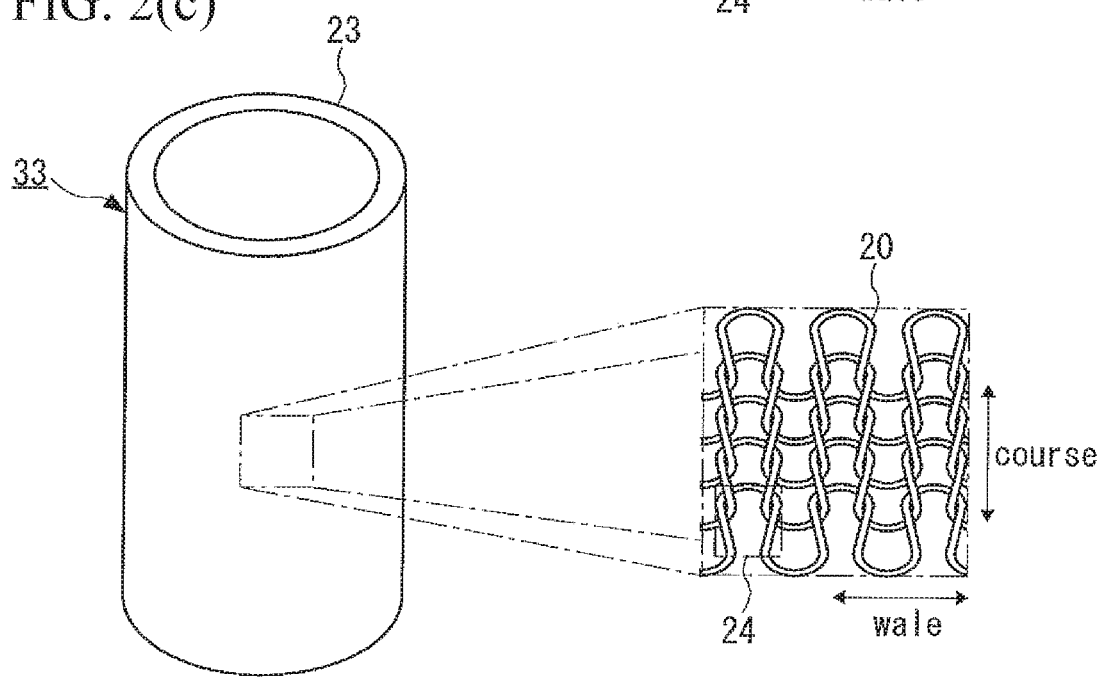

As illustrated in FIGS. 2A to 2C, a plurality of cylindrical metal wire woven fabrics 21 to 23 is formed by weaving the first metal wire 20 so that the course direction faces the cylindrical axis direction and the wale direction faces the cylindrical circumferential direction. In the example illustrated in the drawings, since the plurality of cylindrical metal wire woven fabrics 21 to 23 is woven by one weaving machine, the number of courses and the number of wales are limited to the same number. Additionally, the combination of the metal wire woven fabrics 21 to 23 (the number of courses, the number of wales, and the like) may be changed by changing the interval between the pitches of the weaving machine, and the like, and the first annular portion 31, the second annular portion 32, and the main body portion 33 may be different from one another.

As illustrated in FIG. 2A, unlike the metal wire woven fabrics 22 and 23, the metal wire woven fabric 21 has a structure in which the second metal wire 25 is woven together with the first metal wire 20 at intervals of "1" course. Additionally, the metal wire woven fabric 21 may have a structure in which the second metal wire 25 is woven in all courses. Further, the metal wire woven fabric 21 may have a structure in which the second metal wire 25 is intertwined (entangled) with the first metal wire 20 or the first metal wire 20 is woven first and the second metal wire 25 is intertwined with the stitch 24. The weaving methods of the first metal wire 20 and the second metal wire 25 may be different from each other.

Figure 3A:
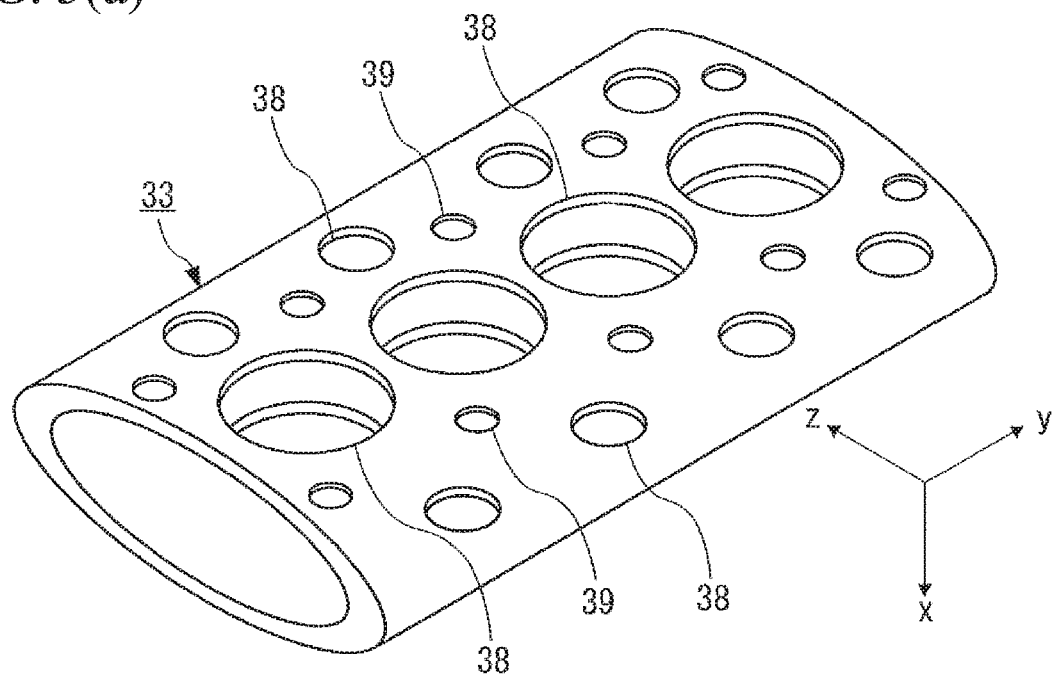

As illustrated in FIG. 3A, the main body portion 33 is formed by the metal wire woven fabric 23. Specifically, the metal wire woven fabric 23 in which the cylindrical axis direction faces the y direction orthogonal to the x direction is first crushed in the x direction (the cylinder radial direction). Next, the stitch 24 at a predetermined position of the metal wire woven fabric 23 is enlarged in the yz plane to form the first arrangement hole 38 and the second arrangement hole 39. The predetermined position mentioned herein indicates a position corresponding to each of the first annular portion 31 and the second annular portion 32. The first arrangement hole 38 for the first annular portion 31 corresponding to the cylinder bore 13 is arranged in series about the z direction which is the width direction of the main body portion 33. The first arrangement hole 38 for the first annular portion 31 corresponding to the water/oil hole 14 is arranged at the z direction side with respect to the first arrangement hole 38 for the first annular portion 31 corresponding to the cylinder bore 13. The second arrangement hole 39 is arranged around the first arrangement hole 38. In this way, the metal wire woven fabric 23 which becomes the main body portion 33 is formed when the metal wire woven fabric is crushed in the x direction.

In the embodiment, the main body portion 33 is formed by one cylindrical metal wire woven fabric 23, but the main body portion 33 may be formed by a plurality of cylindrical metal wire woven fabrics 23. Further, the sizes or shapes of the first arrangement hole 38 and the second arrangement hole 39 are not limited as long as the metal wire woven fabric 21 of the first annular portion 31 and the metal wire woven fabric 22 of the second annular portion 32 can be respectively arranged therein. The first arrangement hole 38 and the second arrangement hole 39 may be formed by cutting out the main body portion 33, but since the main body portion 33 is easily broken when the main body portion is cut out, it is desirable to form the arrangement hole by enlarging the stitch 24.

Figure 3B:
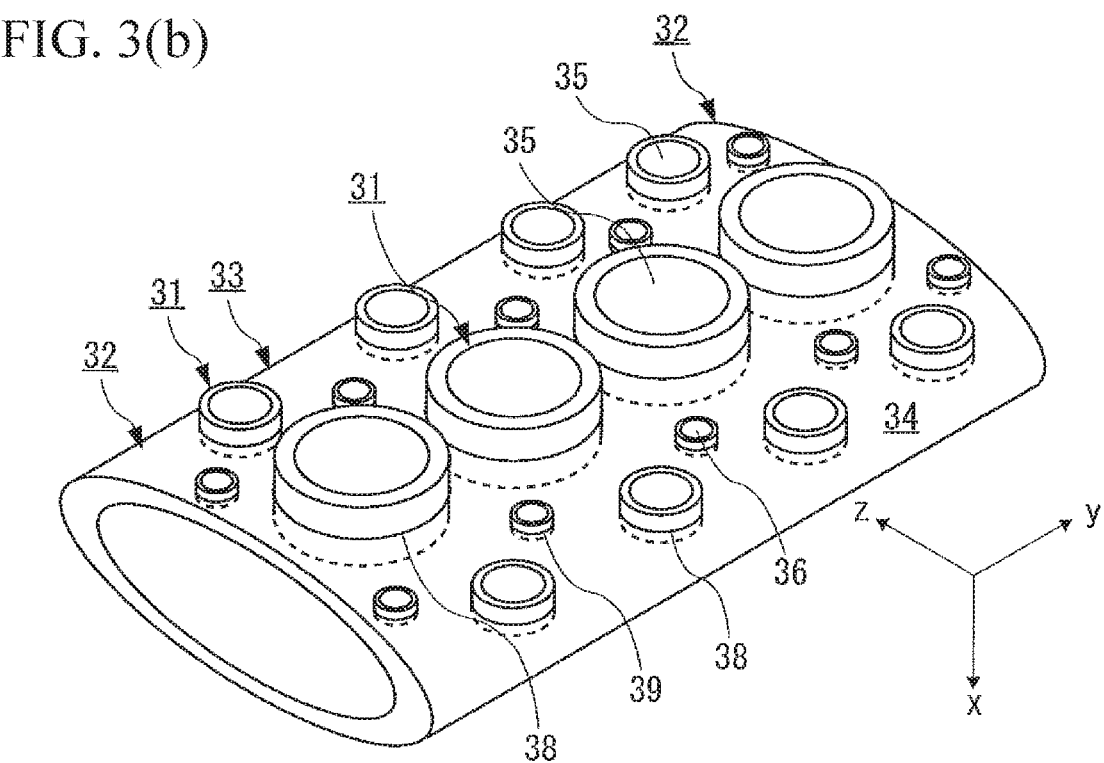

As illustrated in FIG. 3B, the metal wire woven fabric 21 of the first annular portion 31 is arranged inside the first arrangement hole 38, the metal wire woven fabric 22 of the second annular portion 32 is arranged inside the second arrangement hole 39, and each of the cylindrical axis directions thereof is arranged to face the x direction. At this time, the surface of the metal wire woven fabric 23 of the main body portion 33 is orthogonal to the surfaces of the metal wire woven fabric 21 of the first annular portion 31 and the metal wire woven fabric 22 of the second annular portion 32.

Additionally, the metal wire woven fabric 21 and the metal wire woven fabric 22 are respectively crushed in the cylindrical axis direction to be formed in a certain shape to some extent before the fabrics are respectively arranged in the first arrangement hole 38 and the second arrangement hole 39 of the main body portion 33 and then the fabrics are arranged therein. Further, the metal wire woven fabric 23 in which the metal wire woven fabrics 21 and 22 are arranged is crushed in the radial direction to be formed in a certain shape to some extent in this way.

In this way, since the metal wire woven fabrics 21 to 23 are respectively crushed into a temporary shape before the fabrics are arranged at a predetermined position to be integrated with each other, it is possible to handle a woven fabric which is soft and hard to be determined in shape as a state having a predetermined shape to some extent. Accordingly, since the gasket is easily manufactured, it is advantageous for mass production.

Next, all of the combined metal wire woven fabrics 21 to 23 are compressed in the x direction by using a pressing machine (not illustrated) to be formed in a single plate shape having the plate surface 34 formed at both ends in the x direction. As a result, this manufacturing method is completed.

In accordance with the shape of the pressing machine, the outer peripheral shapes of the seal target hole 35 of the first annular portion 31, the fastening tool insertion hole 36 of the second annular portion 32, and the main body portion 33 may be formed by the compression in the x direction and the yz plane.

Further, the filler 37 may be filled into the first annular portion 31 before the first annular portion 31 is compressed in the x direction. For example, when carbon powder is filled into the first annular portion 31 to be compressed and the first annular portion 31 is compressed, the carbon powder is also compressed to seal the stitch 24.

When the first annular portion 31, the second annular portion 32, and the main body portion 33 are compressed, the first metal wires 20 (the stitches 24) are intertwined (entangled) at the respective boundaries thereof to be joined together. Specifically, the first annular portion 31 and the main body portion 33 are joined to each other by entangling the stitches 24 at each of the outer peripheral edge of the first annular portion 31 and the inner peripheral edge of the first arrangement hole 38 of the main body portion 33. Further, the second annular portion 32 and the main body portion 33 are joined to each other so that the stitches 24 of the outer peripheral edge of the second annular portion 32 and the inner peripheral edge of the second arrangement hole 39 are entangled with each other.

In this way, the gasket 30 is formed in a plate shape by entangling each of the first metal wires 20 of the first annular portion 31, the second annular portion 32, and the main body portion 33 formed by the metal wire woven fabrics 21 to 23 and the first annular portion 31 is formed as the high thermal conduction region obtained by weaving the second metal wire 25 having thermal conductivity higher than that of the first metal wire 20. Therefore, since the compressive stress generated by the metal wire woven fabrics 21 to 23 is used for the gasket 30, it is possible to improve the cooling efficiency by the first annular portion 31 corresponding to the high thermal conduction region while keeping the sealing performance. Since the high thermal conduction region can be formed by weaving the second metal wire 25 together with the first metal wire 20, it is advantageous to decrease the number of components or simplify the manufacturing process and to form the high thermal conduction region at an arbitrary position.

As described above, the gasket 30 can improve cooling efficiency with a simpler configuration while keeping the sealing performance of the gasket 30 or the surface pressure around the seal target hole 35 compared to a conventional gasket using a metal plate having high thermal conductivity.

Since the gasket 30 is provided with the high thermal conduction region, it is possible to conduct heat with high efficiency between the cylinder block 11 and the cylinder head 12. Accordingly, since it is advantageous to improve the cooling efficiency, it is possible to prevent a temperature difference due to the combustion of fuel inside the cylinder bore 13.

In particular, since the first annular portion 31 of the peripheral edge of the cylinder bore 13 is formed as the high thermal conduction region, it is possible to improve the cooling performance around the cylinder bore 13. Accordingly, since the temperature around the cylinder bore 13 is set to be low, knocking can be prevented. Further, since it is possible to prevent a decrease in viscosity of lubricating oil or the evaporation thereof, it is possible to decrease a lubricating oil consumption amount. In addition, since it is advantageous to solve a temperature difference around the cylinder bore 13, that is, a non-uniform temperature at the exhaust/intake side, it is possible to prevent the deformation of the cylinder bore 13 due to the temperature difference.

Further, since the first annular portion 31 of the peripheral edge of the water/oil hole 14 is formed as the high thermal conduction region, it is possible to more highly efficiently exchange heat with cooling water or circulating oil by the water/oil hole 14 and thus it is advantageous to further improve the cooling performance.

In this way, the gasket 30 can easily form the high thermal conduction region just by weaving the second metal wire 25 together with the first metal wire 20 forming an active thermal conduction portion.

Further, since the first metal wire 20 is formed by weaving the metal wire woven fabrics 21 to 23, it is possible to realize a decrease in weight compared to the conventional gasket obtained by laminating the plurality of metal plates. Accordingly, since it is advantageous for a decrease in weight of an engine, it is possible to improve the fuel efficiency of the engine.

Further, the second metal wire 25 has a different elastic force with respect to the first metal wire 20 as a mechanical feature. Therefore, even when the metal wire woven fabrics 21 to 23 are compressed in the same direction, the compressive stress of the metal wire woven fabric 21 can be set to be different from the compressive stresses of the metal wire woven fabrics 22 and 23. Accordingly, it is advantageous to set different compressive stresses for the first annular portion 31, the second annular portion 32, and the main body portion 33.

Further, since it is possible to omit a step of forming a bead or fold in each metal plate compared to the conventional gasket obtained by laminating the plurality of metal plates, the gasket can be manufactured simply and productivity can be improved.

Other than the first annular portion 31, the second annular portion 32 or the main body portion 33 may be set to the high thermal conduction region. Further, the high thermal conduction region may be a partial region of the main body portion 33 instead of the entire region thereof.

Figure 4:
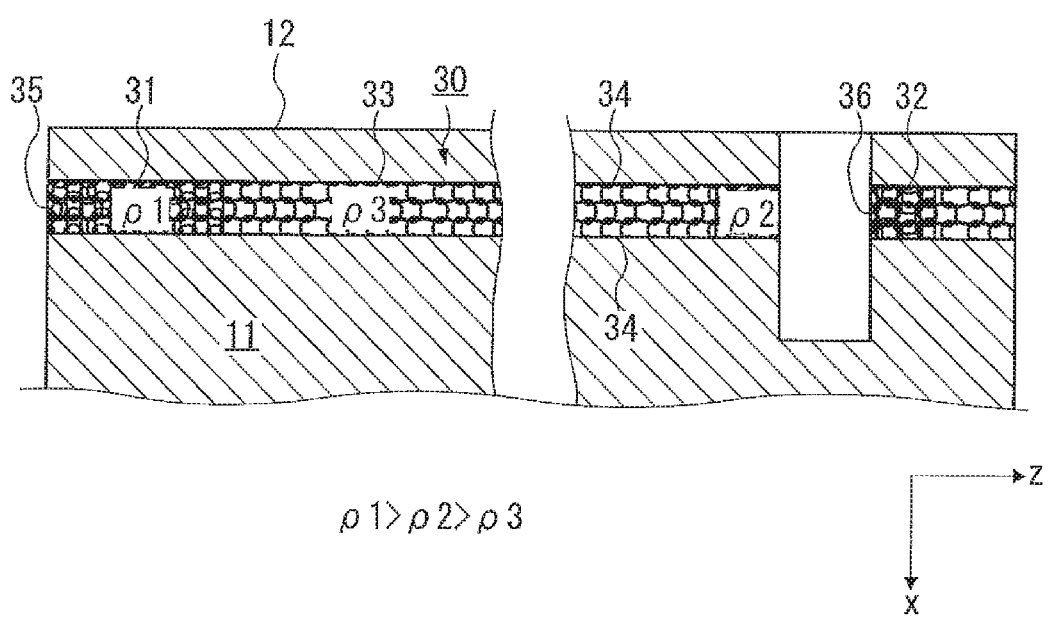
FIG. 4 is a cross-sectional view illustrating a second embodiment of the gasket of the present invention.

As illustrated in FIG. 4, in the gasket 30 of a second embodiment, the first annular portion 31, the second annular portion 32, and the main body portion 33 have different compressive stresses in the x direction while the gasket 30 is sandwiched between the cylinder block 11 and the cylinder head 12 and is fastened by the bolts 10.

The compressive stresses for the first annular portion 31, the second annular portion 32, and the main body portion 33 are generated when the tightening force (fastening force) generated by the bolts 10 becomes equal to or larger than the degree that the plate surface 34 becomes familiar to the seat surfaces of the cylinder block 11 and the cylinder head 12 (the degree that the plate surfaces 34 thereof contact the seat surfaces of the cylinder block 11 and the cylinder head 12 without gaps).

Specifically, in the embodiment, the first annular portion 31, the second annular portion 32, and the main body portion 33 have different volume densities of the first metal wires 20 in the metal wire woven fabrics 21 to 23 forming these portions. Additionally, the volume density is the mass per unit area. For example, the volume density of the first metal wire 20 in the metal wire woven fabric 21 indicates the mass of the first metal wire 20 used for the metal wire woven fabric 21.

The volume density of the first metal wire 20 decreases in order of the volume density $\rho 1$ of the first metal wire 20 of the first annular portion 31, the volume density $\rho 2$ of the first metal wire 20 of the second annular portion 32, and the volume density $\rho 3$ of the first metal wire 20 of the main body portion 33, and the volume density $\rho 1$ becomes maximal. That is, the first metal wire 20 is densified in order of the main body portion 33, the second annular portion 32, and the first annular portion 31, and the first annular portion 31 is most densified. That is, the surface pressure of the gasket 30 increases in order of the main body portion 33, the second annular portion 32, and the first annular portion 31 and the first annular portion 31 has the maximum surface pressure.

The compressive stresses in the x direction of the first annular portion 31, the second annular portion 32, and the main body portion 33 of the gasket 30 in the fastened state can be set to be different in accordance with the material, the wire diameter, and the number of the first metal wire 20. Further, the compressive stress can be set to be different in accordance with the number of courses and the number of wales of the stitch 24 before the compression of the metal wire woven fabric 21 in the x direction, the size of the stitch 24, the weaving method, and the like. In addition, the compressive stress can be set to be different in accordance with the direction or the number of lamination of the metal wire woven fabric 21, or the like. Additionally, there is a case in which the compressive stress in the x direction decreases even when the volume density of the first metal wire 20 is large in accordance with the material of the first metal wire 20 or the weaving method of the metal wire woven fabrics 21 to 23.

Here, in the gasket 30, the size of each of the stitches 24 of the metal wire woven fabrics 21 to 23, the wire diameter of the first metal wire 20, the weaving method, the number of the metal wires 20 to be woven at one time, and the material forming the first metal wire 20 may be set to be different.

In this way, it is desirable that the first annular portion 31, the second annular portion 32, and the main body portion 33 of the gasket 30 have different compressive stresses. When the compressive stresses are set to be different, it is possible to freely adjust the surface pressure of each of the first annular portion 31, the second annular portion 32, and the main body portion 33 when the gasket 30 is fastened. Accordingly, since it is advantageous to keep a surface pressure even when the gasket is fastened for a long period of time compared to the conventional gasket obtained by laminating the plurality of metal plates, the durability can be improved.

The gasket 30 can be formed into an arbitrary shape by using the easy processability and flexibility of the metal wire woven fabrics 21 to 23 and can change the compressive stress at an arbitrary portion in the x direction. Accordingly, the gasket can be applied to various applications.

The gasket 30 is not limited to the flange gasket and can be also applied to, for example, a gasket for an exhaust gas manifold or a gasket for a cylinder head. Then, the gasket can be also applied to a gasket having many seal target holes 35. Additionally, in the gasket for the cylinder head, an annular portion corresponding to a water hole or an oil hole may be manufactured other than the cylinder bore.

The volume density of the first metal wire 20 of the gasket 30 may increase in order of the volume density $\rho1$, the volume density $\rho2$, and the volume density $\rho3$. The repulsive force in the x direction of the first annular portion 31, the second annular portion 32, and the main body portion 33 can be changed variously in response to the shape of the gasket and the application thereof.

REFERENCE SIGNS LIST 20 first metal wire
21 to 23 metal wire woven fabric
25 second metal wire
30 gasket
31 first annular portion (high thermal conduction region)
32 second annular portion
33 main body portion
34 plate surface
35 seal target hole
36 fastening tool insertion hole

What is claimed is:

1. A gasket formed of a metal wire woven fabric, the gasket comprising:
    at least one annular portion which includes a through-hole; and
    a main body portion which is in contact with an outer peripheral edge of the at least one annular portion,
    wherein the at least one annular portion has an annular shape in a state wherein the metal wire wove fabric having a cylindrical shape is compressed in a cylindrical axis direction, and the main body portion has a plate shape in a state wherein the metal wire wove fabric having a cylindrical shape is compressed in a radial direction, and includes at least one arrangement hole wherein a stitch at a predetermined position of the metal wire woven fabric is enlarged, the at least one arrangement hole corresponding to the at least one annular portion,
    the at least one annular portion is arranged in the at least one arrangement hole, first metal wires of the metal wire woven fabric forming the at least one annular portion and the metal wire woven fabric forming the main body portion are entangled with each other so that the at least one annular portion and the main body portion are joined to each other, a thermal conduction region is formed in at least a partial region of the gasket in a plan view, and a second metal wire having thermal conductivity higher than that of the first metal wire is woven to the thermal conduction region together with the first metal wire,
    the metal wire woven fabrics of the at least one annular portion and the main body portion include the first metal wires weaved in a course direction and in a wale direction perpendicular to the course direction to form stitches, and
    the at least one annular portion and the main body portion are jointed such that the first metal wires of the at least one annular portion in the course direction is arranged substantially perpendicular to the first metal wires of the main body portion in the course direction and the wale direction, and the first metal wires of the at least one annular portion in the wale direction is arranged substantially along an outer peripheral edge of the at least one arrangement hole.

2. The gasket according to claim 1, wherein the thermal conduction region is the at least one annular portion.

3. The gasket according to claim 1, wherein the first metal wire is formed of stainless steel and the second metal wire is formed of copper or copper alloy.

4. A gasket manufacturing method comprising:
    weaving a cylindrical metal wire woven fabric and another cylindrical metal wire woven fabric;
    forming, in weaving the cylindrical metal wire woven fabric and the another cylindrical metal wire woven fabric, a high thermal conduction region by weaving a second metal wire having thermal conductivity higher than that of a first metal wire in at least a partial region of the cylindrical metal wire woven fabric and the another cylindrical metal wire woven fabric, together with the first metal wire forming the partial region;
    crushing the cylindrical metal wire woven fabric in a cylindrical axis direction to form an annular portion and crushing the another cylindrical metal wire woven fabric in a radial direction to form a main body portion;
    forming an arrangement hole at a predetermined position of the main body portion and arranging the annular portion at the arrangement hole; and
    crushing the main body portion and the annular portion to be integrated with each other.

5. The gasket according to claim 1, wherein the at least one annular portion comprises a first annular portion, as the thermal conduction region, including the metal wire woven fabric having the first metal wires and the second metal wires, and a filler sealing gaps, each being formed between the stitches, and in the metal wire woven fabric of the first annular portion, the first metal wire and the second metal wire with the first metal wire are alternatively woven, and the main body portion includes the metal wire woven fabric consisting of the first metal wires.

6. The gasket according to claim 5, wherein the at least one annular portion further includes a second annular portion formed with the metal wire woven fabric consisting of the first metal wires, and
    the first annular portion is arranged at a center portion of the main body portion and the second annular portion is arranged at a side portion of the main body portion.

* * * * *